(12) United States Patent
Gilman

(10) Patent No.: US 12,073,237 B2
(45) Date of Patent: Aug. 27, 2024

(54) MULTI-PLATFORM PROCESS SERVICE

(71) Applicant: Microsoft Technology Licensing, LLC, Redmond, WA (US)

(72) Inventor: Jonathan Andrew Gilman, Zionsville, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/066,486

(22) Filed: Dec. 15, 2022

(65) Prior Publication Data

US 2024/0095046 A1 Mar. 21, 2024

Related U.S. Application Data

(60) Provisional application No. 63/407,843, filed on Sep. 19, 2022.

(51) Int. Cl.
*G06F 8/30* (2018.01)
*G06F 9/451* (2018.01)
*G06F 9/46* (2006.01)

(52) U.S. Cl.
CPC .............. *G06F 9/451* (2018.02); *G06F 9/468* (2013.01)

(58) Field of Classification Search
CPC . G06F 9/451; G06F 9/468; G06F 8/30; G06F 8/34; G06F 8/36; G06F 8/38; G06F 8/477
See application file for complete search history.

(56) References Cited

U.S. PATENT DOCUMENTS

| 7,020,494 B2 | 3/2006 | Vogler et al. |
| 9,547,532 B2 | 1/2017 | Loughry et al. |
| 9,645,989 B2 | 5/2017 | Folsom et al. |

(Continued)

FOREIGN PATENT DOCUMENTS

| WO | 2006089764 A1 | 8/2006 |
| WO | 2018212753 A1 | 11/2018 |

OTHER PUBLICATIONS

"International Search Report and Written Opinion issued in PCT Application No. PCT/US23/030753", Mailed Date: Oct. 24, 2023, 14 Pages.

*Primary Examiner* — Mahelet Shiberou
(74) *Attorney, Agent, or Firm* — Holzer Patel Drennan

(57) ABSTRACT

Execution of a process using a select platform-specific process application is provided, including identifying, from a set of received inputs, a collection of selection input parameter values uniquely associated in memory with a select platform-specific process application among different platform-specific process applications configured to implement a process of a process type, identifying a process population template associated in memory with the select platform-specific process application, the process population template identifying data input fields accepted as inputs to the select platform-specific process application, receiving, from a uniform user interface, a set of user inputs, and executing the process population template. The executing includes modifying the set of user inputs to generate modified inputs of a form consistent with the data input fields accepted as inputs to the select platform-specific process application and executing the select platform specific process application based on the modified inputs.

17 Claims, 5 Drawing Sheets

(56) References Cited

U.S. PATENT DOCUMENTS

| | | | |
|---|---|---|---|
| 10,372,201 B2 | | 8/2019 | Meenakshisundaram et al. |
| 11,157,271 B2 | | 10/2021 | Danthalapelli et al. |
| 11,226,834 B2 | * | 1/2022 | Andolina .............. G06F 3/0481 |
| 11,354,491 B1 | | 6/2022 | Wade et al. |
| 11,368,513 B1 | | 6/2022 | Speller et al. |
| 2012/0054599 A1 | | 3/2012 | Nixon et al. |
| 2012/0151311 A1 | | 6/2012 | Mathai et al. |
| 2017/0329505 A1 | * | 11/2017 | Richter ..................... G06F 8/38 |
| 2019/0327314 A1 | * | 10/2019 | Sahoo .................... H04L 67/51 |
| 2020/0034940 A1 | * | 1/2020 | Parikh .................. G06Q 50/163 |
| 2022/0179544 A1 | * | 6/2022 | Ritter .................. G06F 3/04845 |
| 2023/0208843 A1 | * | 6/2023 | Katahanas .............. H04L 67/60 |
| | | | 726/4 |

\* cited by examiner

| Sales Orders | | | | | | |
|---|---|---|---|---|---|---|
| 200007238 🔍 | | | | | | |
| Details | | | | | | |
| | +Create | ✎Change — 304 | | | | |
| Attachments | | | | | | |
| Customer* | Customer Name | | Order Type* | Sales Org* | Delivery Date | Header Text |
| 2847 | BuildCo | | SOFT ⌄ | GLOB ⌄ | 1/4/2022 📅 | |
| Ship To* | Ship To Name | | Customer's PO | Created By | Total Price | |
| 2847 | BuildCo | | 6546456 | JON | $3,162.56 | |

Items — 308

| Item | Material | Plant | Description | Quantity | Unit | Unit Price | Total Price | Status |
|---|---|---|---|---|---|---|---|---|
| 1 | PRODUCT1 | SOFT | Pruduct1 | 10 | EA | $19.12 | $191.16 | View |
| 2 | PRODUCT2 | SOFT | Pruduct2 | 10 | EA | $42.46 | $424.60 | View |
| 3 | PRODUCT3 | SOFT | Pruduct3 | 10 | EA | $63.66 | $636.60 | View |
| 4 | PRODUCT4 | SOFT | Pruduct4 | 10 | EA | $84.90 | $849.00 | View |
| 5 | PRODUCT5 | SOFT | Pruduct5 | 10 | EA | $106.12 | $1061.20 | View |

Submit — 310

MULTI-PLATFORM PROCESS SERVICE

CROSS-REFERENCE TO RELATED APPLICATIONS

This application claims a benefit of priority to U.S. Provisional Patent Application No. 63/407,843, entitled "Multi-Platform Process Service," and filed on Sep. 19, 2022, which is specifically incorporated by reference for all that it discloses and teaches.

BACKGROUND

Computer processes used by enterprises can be reduced to a finite set of process types. Several different platforms provide software services for managing processes of different process types. Examples of process types managed by such platforms include sales, purchases, processing payroll, onboarding new employees, adding a project to a workgroup, or registering a human resources complaint. An enterprise has the choice of using any of several different platform-specific process applications to manage each different process type. In enterprises with multiple subdivisions, each subdivision may deploy one of a plurality of different platform-specific process applications to manage the same process.

SUMMARY

The described technology provides execution of a process using a select platform-specific process application is provided, including identifying, from a set of received inputs, a collection of selection input parameter values uniquely associated in memory with a select platform-specific process application among different platform-specific process applications configured to implement a process of a process type, identifying a process population template associated in memory with the select platform-specific process application, the process population template identifying data input fields accepted as inputs to the select platform-specific process application, receiving, from a uniform user interface, a set of user inputs, and executing the process population template. The executing includes modifying the set of user inputs to generate modified inputs of a form consistent with the data input fields accepted as inputs to the select platform-specific process application and executing the select platform-specific process application based on the modified inputs.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 3 illustrates an example uniform user interface for use with a multi-platform process service.

DETAILED DESCRIPTION

Figure 1:
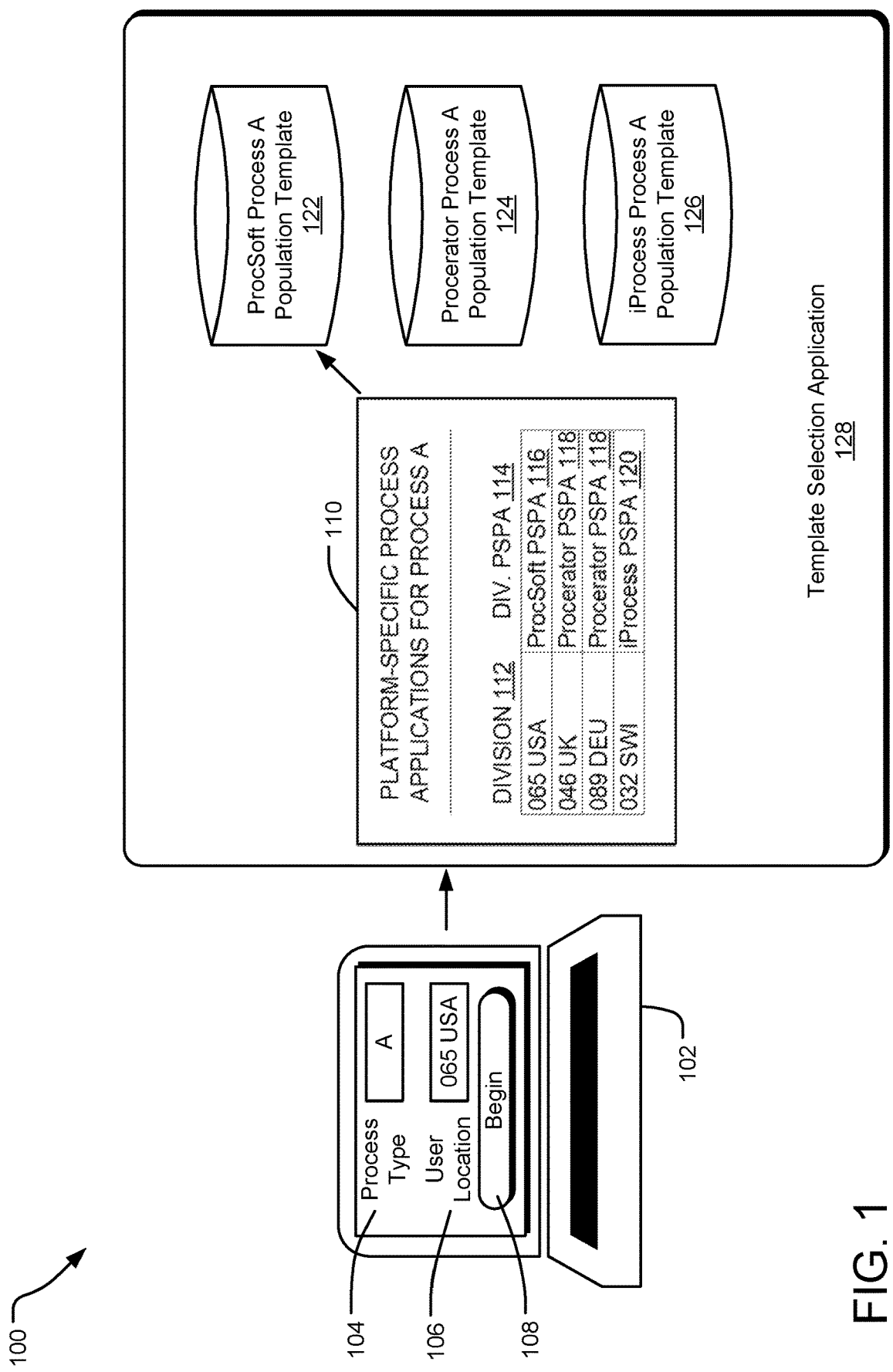
FIG. 1 illustrates an example system for executing a process using a select platform-specific process application (PSPA) of a multi-platform process service.

Different platforms (e.g., customer relationship management platforms) offer different platform-specific process applications to execute the same standardized process types. Because the different platform-specific process applications have different user interfaces, request different information, and/or are organized to have different decision forks that lead to different forms requesting different inputs, service providers (e.g., enterprise users) may undergo training to become familiar with many different individual platform-specific process applications for the same process type. This training is costly, and the use of multiple different platform-specific process applications by an enterprise provides a greater opportunity for human error (e.g., by selecting an incorrect platform-specific process application for a correct process type).

In enterprises with multiple sub-entities, the sub-entities may each use different platform-specific process applications for a single process type. This may be a result of delegation within the enterprise that allows each division to choose a preferred platform. This may also result from the enterprise acquiring another entity that already used a different platform. In such cases, enterprise employees, such as human resources representatives, have to have a working knowledge of how to execute those processes on different platforms using different platform-specific process applications.

The presently disclosed technology provides a single software solution that interfaces with various underlying platform-specific process applications to allow a user to execute any of the underlying processes while interfacing exclusively with a single uniform, standardized set of graphical user interfaces (GUIs) regardless of the process type or underlying process. In order to achieve the foregoing, the software solution performs several steps, including identifying a relevant process type. In implementations, the process type is identified at least in part based on a set of login credentials or other user identification data received as input to a template selection application. The login credentials represent a role of an enterprise user to which the credentials are assigned. A template selection application identifies different platform-specific process applications associated in memory with the process type. For example, if the process type is onboarding a new employee, the template selection application will identify different platform-specific process applications that accomplish the process of onboarding a new employee.

In an implementation, a graphical user interface (GUI) is provided to a user display. In an implementation, the graphical user interface includes a form requesting platform selection inputs related to the process type for submission to the template selection application. In another implementation, the template selection application additionally or alternatively receives predefined platform selection inputs from a computing system controlled by the enterprise.

In an implementation, the template selection application identifies a process population template associated in memory with the select platform-specific process application of the different platform-specific process applications available to implement processes of the process type. The process population template identifies data input fields accepted as inputs to the select platform-specific process application. For example, the data input fields are configured to receive data usable by the select platform-specific process application to execute the process of the process type. Rather than presenting a user interface supplied by the platform-specific process application, a uniform user interface is presented based on the process population template. In an implementation, the process population template includes interface data that is configured to provide uniform fields for presentation in the uniform user interface in a platform-agnostic manner. In this manner, the uniform user interface can present uniform fields, the data from which process population templates can provide modified inputs digestible by the different platform-specific process applications that execute a same or analogous process of a process type. The uniform fields are configured to receive data for entry in analogous data fields usable by the different platform-specific process applications that are labeled or presented differently from the uniform fields by each of the platform-specific process applications.

In an implementation, the uniform fields are configured to receive user input values in a form the select platform-specific process application is not configured to process. In this implementation, the input to the uniform field is modified to generate a modified input processable by a corresponding field usable by the platform-specific process application. For example, in an implementation, each uniform field uniformly represents a user input corresponding to a field identified differently between platform-specific process applications. In an implementation, the modification may include converting a file format or an object format of the set of user inputs entered into the uniform fields to generate a corresponding modified input. The modification may, additionally or alternatively, include the performance of an operation (e.g., addition, subtraction, multiplication, division, indexing, lookup, modulus, max, min, etc.) on a plurality of user inputs to yield a single modified input. An example modification includes providing uniform fields of "space available in a storage volume" and "space occupied within a volume" and adding them to generate a modified input of "total space in storage volume" usable by the select platform-specific process application.

In an implementation, the platform-specific process application executes a process of the process type based on the populated data input fields. For example, the process population template associated in memory with the select platform-specific process application can execute the platform-specific process application using the data inputs received from the uniform fields of the uniform user interface or modified inputs derived from the data inputs received.

Providing a standardized uniform user interface and/or user experience that receives user inputs in uniform fields to be transmitted and/or modified to be accepted by data input fields of process population templates from different platform-specific process applications can reduce the amount of training an enterprise user needs to work with a system configured to operate with different platforms. The standardized uniform user interface and/or user experience can also reduce human error by automating the process of selecting the appropriate platform-specific process application for any particular processing scenario.

FIG. 1 illustrates an example system 100 for executing a process using a select platform-specific process application (PSPA) of a multi-platform process service. The process is of a process type that can be implemented by different PSPAs provided by different platforms. The multi-platform process service is configured to execute processes using different PSPAs for different processes, different users, different enterprises, and/or different sub-entities within an enterprise. For example, as illustrated, a computing device 102 includes a graphical user interface (UI) that presents a process type field 104, a user location field 106, and a begin button 108. The user has entered "A" in the process-type field and "065 USA" in the user location field 106. Implementations are contemplated in which some or all of this selection data entered by a user is automatically populated (e.g., based on predefined inputs determined by a controlling enterprise). For example, in an implementation, the user location field 106 is automatically populated based on a detected location of an enterprise, a detected location of a client serviced by the enterprise, or a detected location of the enterprise user of the system 100. In other implementations, the template selection application 128 is automatically populated with input data, including selection input parameters based on provided data without accepting data from a UI.

In the illustrated implementation, the user then selects the begin button 108 to proceed. Alternatively, if the selection input parameters are automatically populated, the computing device 102 can eschew the presentation of the illustrated GUI. The data inputs, including the selection input parameters, entered into the GUI (or automatically populated), are provided by the computing device 102 to a template selection application 128. The template selection application 128 is configured to identify, from a set of received inputs, a collection of selection input parameter values uniquely associated in memory with a select platform-specific process application among different platform-specific process applications configured to implement a process of a process type. The template selection application 128 is then configured to identify a process population template associated in memory with the select platform-specific process application, the process population template identifying data input fields accepted as inputs to the select platform-specific process application.

The template selection application 128 includes a database 110 with data representing PSPAs for executing process A. Based on a received selection input parameter value of the process type being "A," the template selection application 128 selects the database 110 to determine which PSPA to use to execute the process of A process type. In the illustrated implementation, the enterprise has different divisions that use different PSPAs to execute a process of process type A. The database 110 includes a division column 112 that represents the different divisions within the enterprise. The database 110 further includes a division PSPA column 114 that lists PSPAs that correspond to the divisions in the division column. As listed, the USA (country code 065) division uses a ProcSoft PSPA 116 of a Procsoft platform, the U.K. and German divisions use a Procerator PSPA 118 of a Procerator platform, and the Swiss division uses an iProcess PSPA 120 of an iProcess platform. The Procsoft platform, Procerator platform, and iProcess platform provide the respective PSPAs 116-120 that all execute the same or analogous process of the process type A. In implementations, the different PSPAs 116-120 each execute from a different service entity platform. While the UIs (e.g., including layouts) and user experiences (e.g., including decision trees and forks) differ between the PSPAs 116-120, the process and data required to execute the processes are largely the same.

The template selection application 128 selects a process population template representing data to be consumed by a select one of the PSPAs 116-120. The template selection application 128 is configured to select the correct one of the PSPAs 116-120 for the specified selection input parameter values received from the computing device 102. For example, the template selection application 128 stores or references associations between the ProcSoft PSPA 116 and a ProcSoft Process A Population Template 122, between the Procerator PSPA 118 and a Procerator Process A Population Template 124, and between the iProcess PSPA 120 and the iProcess Process A Population Template 126. The template selection application identifies a select one of the process population templates 122-126 associated in memory with the select one of the PSPAs 116-120. Based on the received selection input parameter value of "065 USA" for the "User Location" parameter, the template selection application 128 references the database 110 and selects the ProcSoft Process A Population Template 122 associated with the ProcSoft PSPA 116.

The process population templates 122-126 define data input fields accepted as inputs to the select PSPA (e.g., the ProcSoft PSPA 116) to execute the process of process type A. In the illustrated implementation, the template selection application 128 selects the ProcSoft PSPA 116 to execute the process of process type A and correspondingly selects the ProcSoft Process A Population Template 122. Selection input parameters are parameters that are used by the template selection application to select a PSPA and/or a process population template. The selection input parameters are associated in memory with each of the PSPAs 116-120 provided by different services (e.g., different service organizations), and the selection input parameters distinguish between which service to use to make an appropriate selection of a process population template.

In an implementation, the template selection application 128 receives data representing a selection of a process of a process type. The data representing a selection may include a user input of a process type. Alternatively or additionally, the process type provided for selection may be one of a plurality process types associated in memory with user identification data (e.g., a set of login credentials of the user). This may establish a role-based filter that provides a selection of process types to the user based on the user's role within an enterprise. For example, a human resources representative is given access to an onboarding process selection and a sexual harassment complaint process selection but is not given access to a sales process, the access to which is limited to sales personnel. The template selection application 128 then identifies multiple different PSPAs operable to execute a process of the selected process type. The template selection application 128 then chooses a PSPA 116-120 based on selection input parameters. In this way, users with the same role will receive a uniform UI experience on which the users with that role only need to be trained for the uniform fields and elements presented. This will be the case even if the users in the same roles operate the same process using different PSPAs with different inputs that would otherwise present non-uniform native UIs. In this sense, the uniform UI is presented instead of the non-uniform UIs native to the PSPAs.

The selection input parameters (e.g., platform selection data elements) assume values that are either alone or in select combinations uniquely associated in memory with different PSPAs. Examples of selection input parameters include geographic data associated with a client user to which an enterprise operating the template selection application 128 provides services, geographic data associated with the enterprise, geographic data associated with an enterprise user belonging to the enterprise executing the template selection application 128, a currency being used in a transaction, a selected user preference, a division of the enterprise (e.g., a sub-entity or geographic or otherwise delimited division of the enterprise), an identifier of the division of the enterprise, an identifier of the enterprise, an identifier of the division of the enterprise, an identifier of a relevant platform (e.g., one of ProcSoft, Procerator, and iProcess, as illustrated), an identifier of the enterprise user, an identifier of the client user (e.g., receiving a service from the enterprise and/or from an enterprise user), or an identifier of the select PSPA.

The template selection application 128 identifies a select process population template (e.g., the ProcSoft Process A Population Template 122, as illustrated) associated in memory (e.g., by the database 110) with the select PSPA (e.g., the ProcSoft PSPA 116, as illustrated). The select process population template identifies data input fields accepted as inputs to the select PSPA to execute the process of the process type (e.g., process A, as illustrated). Once the template selection application 128 selects one of the process population templates 122, 124, 126, the selected process population template is executed to perform a sequence of operations that include executing the select PSPA (e.g., the ProcSoft PSPA 116) without requiring the user to interact with a UI that is provided by the select PSPA. Instead, the selected process population template receives user inputs through a uniform UI (as discussed further with respect to FIG. 2), modifies those inputs into a form and format expected by the select PSPA, and executes the select PSPA based on the modified inputs, simplifying the user experience by facilitating the user interaction with the uniform UI (e.g., a simplified UI) as compared to that provided by the select PSPA.

In an implementation, to initially configure the template selection application 128, a configuration manager of the system 100 executes a configuration process. The configuration process begins with the configuration manager determining a set of PSPAs used by an enterprise to implement the process of the process type. This can include determining the different platform-specific process applications used by an enterprise to implement processes of the process type, determining a collection of selection input parameter values uniquely associated with each one of the different platform-specific process applications of the process type, and configuring a template selection application to select the select platform-specific process application from the different platform-specific process applications responsive to receiving, from a user, a collection of selection input parameter values matching the determined collection of selection input parameter values uniquely associated in memory with the select platform-specific process application.

In an implementation, the configuration manager parses and analyzes log files of a given enterprise to determine the set of different PSPAs used by the enterprise. The configuration manager then determines a collection of input parameter values uniquely associated in memory with each one of the different PSPAs of the process type. The configuration manager then configures the template selection application 128 to select the select PSPA from the different platform PSPAs based on (e.g., responsive to) receiving from a user a collection of input parameters matching the determined collection of input parameter values uniquely associated in memory with the select PSPA.

In an implementation, the template selection application 128 receives entity-defined system input, and the identification of the collection of input parameter values uniquely associated in memory with the select PSPA is further based on (or from) the entity-defined system input. Entity-defined system inputs can include, for example, any of the selection input parameters or the user credential data described herein. In an implementation, rather than presenting a user with fields (e.g., the process type field 104 and the user location field 106), the computing device 102 and/or the template selection application 128 automatically selects the select PSPA and corresponding select template based on automatically populated data. For example, a custodian may be presented with a work-order template from a particular PSPA based on an identifier of the enterprise to which the custodian belongs and an identifier associated with the custodial role of the custodian (e.g., represented in a database that associates user credentials or other user identification data with roles in the enterprise). In an implementation, the template selection application 128 operates within a dedicated workspace or virtual machine specific to the enterprise or division, such that the entity-defined system input is associated only with PSPAs used by the enterprise and/or one or more of its divisions.

In an implementation, despite different divisions of a single enterprise using different PSPAs for a single process, a central enterprise user who operates on data for the different divisions is presented with a uniform UI or user experience rather than with a native UI or user experience of a particular PSPA. For example, a customer service representative who takes feedback or orders from international customers that are to be routed to particular geographic divisions of the enterprise is presented as a uniform UI or UI with data fields representing data a particular PSPA requires. For example, six different PSPAs for a sales process include similar or analogous fields for determining the sales. In a PSPA, a quantity is designated "number of units." In another PSPA, a quantity is represented as "total units." The uniform UI or user experience may represent the analogous field as "quantity." In doing so, the uniform UI or user experience limits the training the customer representative needs to receive to use the uniform UI or user experience by keeping the terminology uniform. In implementations, the uniform UI or user experience presents the forms from the select process population template without identifying (e.g., by expressly concealing or merely by not presenting) the select PSPA. In this implementation, the UI or user experience is presented in a platform or PSPA agnostic manner, such that the user need not know which platform, PSPA, or process population template the template selection application 128 selects.

Notably, an initial configuration of the template selection application 128 may depend upon enterprise-specific data to map process types and relevant user input parameters to corresponding PSPAs that are used in each corresponding circumstance by the enterprise. In some implementations, these configuration actions are fully or partially automated. For example, a template selection configuration manager (not shown) may parse and/or analyze a set of log files from the enterprise to determine which PSPAs are used and/or by which divisions of the enterprise. This parsing and analysis may lead to the identification of a first PSPA (e.g., the ProcSoft PSPA 116, as illustrated) as an application that is commonly used by a first sub-entity (e.g., the illustrated 065 USA division) of an enterprise to execute the process of the process type and of a second PSPA (e.g., the iProcess PSPA 120, as illustrated) that is commonly used by a second sub-entity (e.g., the illustrated 032 Swiss division) of the enterprise to execute the process of the process type. As illustrated, the first PSPA, the ProcSoft PSPA 116, differs from the second PSPA, the iProcess PSPA 120, despite both the ProcSoft PSPA 116 and the iProcess PSPA 120 executing analogous processes from different platforms.

To initially configure the template selection application, the configuration manager associates parameter values (e.g., elements of the selection input parameters or user credentials) in memory with each of the PSPAs that subsequently allow the template selection application to select from among available PSPAs to implement a process of a given process type. For example, a first PSPA may be associated with a process type "sale" and a sale location parameter value of "North America," while a second PSPA may be associated with a process type of "sale" and a sale location parameter value of "Europe." Based on predefined associations between each process and select parameter values of platform selection inputs, such as the location parameter value in the example above, the template selection application can be configured to select one of the PSPAs for the execution of a process in response to the receipt of platform selection inputs that correspond to (e.g., match) the parameter values stored in association with that PSPA.

Based on the above-described predefined associations between the platform selection input parameter values and a select PSPA, an applicable PSPA can be identified based on platform selection input values, and a process population template is identified based on (e.g., responsive to) the selection of the select PSPA.

Regardless of which of the PSPAs is selected to implement a process of a given process type, the uniform UI can receive output data from the select PSPA and present the output data inline in a uniform manner such that the user may not have knowledge of the underlying PSPA with which the template selection application 128 interfaces to implement a given process. For example, an international customer service representative enters a sales order for the U.K. division. The template selection application will select the Procrator PSPA 118 and its corresponding Procrator Process A Population Template 124 to enter the sales order. The customer service representative is then presented with a success notification in a single UI with data from other sales orders from the USA division that were processed by the ProcSoft PSPA 116 using the ProcSoft Process A Population Template 122. In an implementation, the uniform UI and/or user experience present the output from the different PSPAs 116-120 in a uniform manner and/or in a manner agnostic to the PSPA or platform used. Alternatively, the PSPA or platform could be displayed in a field with the output data.

Figure 2:
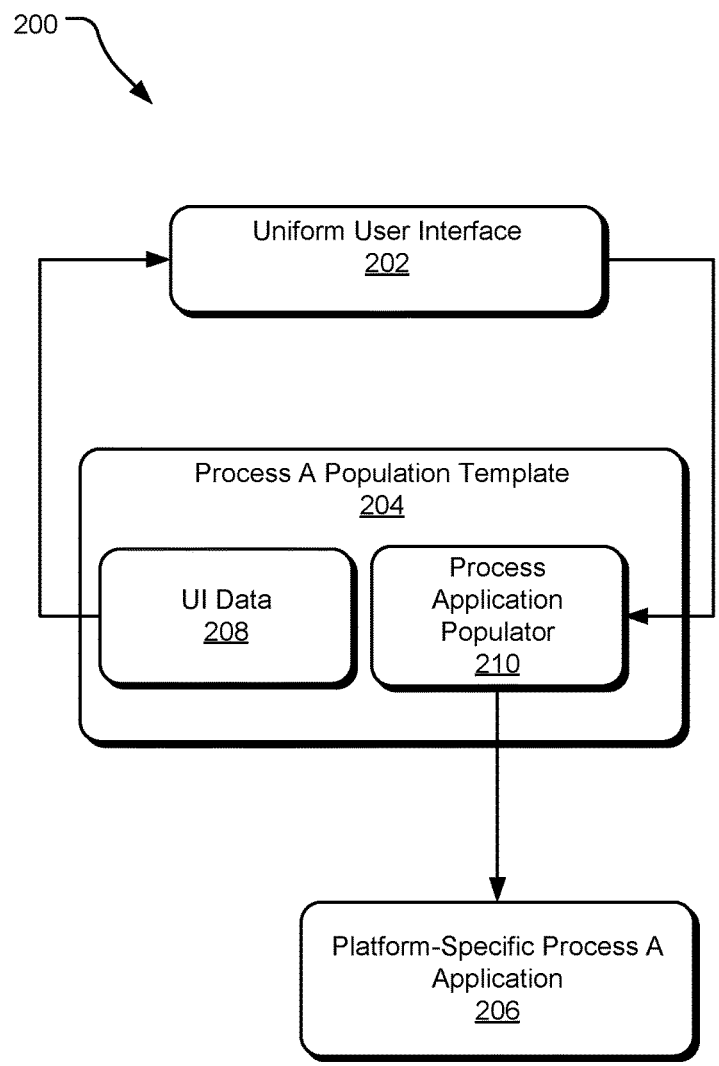
FIG. 2 illustrates another example system for executing a process using a select platform-specific process application (PSPA) of a multi-platform process service.

FIG. 2 illustrates another example system 200 for executing a process using a select platform-specific process application (PSPA) of a multi-platform process service. The system 200 includes a uniform user interface (UI) 202, a process A population template 204, and a platform-specific process A application 206. After the process A population template 204 and/or a corresponding platform-specific process A application 206 has been selected (e.g., as described with respect to the system 100 in FIG. 1), the population template 204 is executed. Execution of the population template 204 (and other population templates such as 122, 124, 126 shown in FIG. 1) causes the presentation of the uniform UI 202 on a user display. The uniform UI 202 presents fields for receiving user inputs. In one implementation, the fields presented in the uniform UI 202 remain the same regardless of which population template has been selected. For example, all different population templates (e.g., population templates such as 122, 124, 126 shown in FIG. 1) may provide the same uniform UI 202 or condensed or expanded versions thereof (e.g., some of the population templates may hide certain data fields that are not needed as inputs to the corresponding selected PSPA). For example, regardless of the form or identification associated with a common parameter for input into the different PSPAs, the common parameter is presented as a uniform field in the uniform UI 202.

The uniform UI 202 (and/or an associated user experience) is substantially uniformly presented (e.g., with uniform fonts, uniform terminology that would otherwise differ between platforms, uniform layout, or uniform decision trees for navigating between UI elements). In one implementation, the identifier or format of a field to accept a type of parameter represented in uniform fields is consistently presented in the uniform UI 202, regardless of the selected PSPA or corresponding selected process population template. Because the uniform UI 202 is largely uniform for all of the templates available from different platforms for process A, training an enterprise user to use the uniform UI 202 and/or user experience is simpler than training the enterprise user to navigate platform-specific UIs and/or user experiences. The uniform UI 202 differs between PSPAs to the extent that some PSPAs request information that is not directly or analogously requested by other PSPAs.

The select process population template receives user inputs for completing the identified data input fields from the user via the uniform fields presented in the uniform UI 202. The process population template automatically populates data input fields of the corresponding select PSPA with the user inputs received from and/or modified inputs generated based on (e.g., by) the select process population template. The select PSPA then executes the process of the process type based on the populated data fields. As illustrated, the process application populator 210 of the process A population template 204 populates data fields of the platform-specific process A application 206 with user inputs and/or modified inputs.

In an implementation, the process A population template 204 is platform-specific and uniquely associated with the platform-specific process A application 206. The process A population template includes a process application populator 210. The process application populator 210 receives a set of user inputs from the uniform UI 202. The process application populator 210 transmits the set of user inputs or modified versions thereof to the platform-specific process A application 206. In an implementation, the process application populator 210 further executes (e.g., instructs to execute) the platform-specific process A application based on the set of user inputs or modified versions thereof.

In an implementation, one or more of the received set of user inputs are received in a form the platform-specific process A application is not configured to process. In this implementation, the process application populator 210 modifies the user inputs to generate modified inputs usable by the platform-specific process A application 206. In an implementation, the modification includes the process application populator 210 making a change in data format (e.g., conversion from a file type or object type to a different file type or object type). In another implementation, the modification, additionally or alternatively, includes the process application populator 210 performing an operation on more than one user input to generate one or more modified inputs. For example, in an implementation, the uniform UI 202 may include uniform fields labeled "quantity" and "cost per unit," and the process application populator 210 multiplies the values of the uniform fields to yield a modified output of "item sub-total" that is digestible by the platform-specific process A application 206. Implementations are also contemplated in which the modification, additionally or alternatively, includes the process application populator 210 performing an operation on one or more user inputs to generate one or more modified inputs. In another implementation, the modification is a translation operation that translates between a uniform field and an analogous user input field that is digestible by the platform-specific process A application 206 without otherwise converting the data input associated with the field. For example, the process application populator 210 can transfer a user input into the uniform field of "cost" to a user input field of "price" that is digestible by the platform-specific process A application 206.

In an implementation, the process A population template 204 includes UI data 208. The UI data 208 includes data regarding which uniform fields to present in the uniform UI 202. In implementations, the UI data 208 includes an image, layout, or another formatting to provide a specific implementation of the uniform UI 202. In implementations, each uniform field uniformly represents a user input corresponding to a field identified differently between the different PSPAs. In an implementation, the uniform UI 202 presented is configured based on the UI data 208. In an implementation, one or more of the uniform fields uniformly represent a user input corresponding to a field identified differently between the platform-specific process applications.

In an implementation, a plurality of the uniform fields represent a set of user inputs in a format of the uniform UI that requires operations to generate a corresponding modified input represented in the select process population template that is digestible by a corresponding PSPA. In these implementations, the UI data 208 includes modification data to modify a uniform template of the uniform UI 202 to include uniform fields and/or exclude uniform fields that collect data usable (e.g., in raw or modified form) by the platform-specific process A application 206.

FIG. 3 illustrates an example uniform user interface (UI) 300 that is presented by a multi-platform process service configured to selectively interface (e.g., by selection) with multiple underlying platform-specific process applications (PSPAs). In FIG. 3, the uniform UI 300 is a template usable to populate input fields accepted by an applicable one of the multiple different underlying PSPAs. In the illustrated implementation, the enterprise user has searched for sales order "200007238." The enterprise user, having recognized an error in the sales order, has clicked a change button 304 in order to change the details of the order. In response, a backend system requests, from a template selection application, a template associated with an identified PSPA used to originally create the sales order 200007328. This template can, in turn, be used to collect inputs from the user (e.g., changes to the order) and to provide the user-provided inputs to the identified PSPA to execute a "modify order" process of the PSPA and thereby effect a modification to the sales order.

Based on user-specified or enterprise-defined platform selection parameters, the template selection application selects a particular PSPA and its associated template. In the illustrated example, the template selection application uses one or more of the platform selection parameters (e.g., state, city, zip code, customer name, or customer I.D.) to select one of the PSPAs configured to execute a process of process type "modify order." For example, because BuildCo is located in the USA, and the USA division of the enterprise uses a first PSPA for modifying orders, the template selection application selects the first PSPA and its associated template.

The uniform UI 300 displays uniform fields, including uniform fields for parameters 306 (which can include one or more of the platform selection parameters), which may be unchanged regardless of the specified PSPA that is used to generate the sales order corresponding to the information presented with the uniform UI 300. For example, the parameters 306 presented include a customer I.D. ("2847"), a customer name ("BuildCo"), an order type ("SOFT," representing software), sales organization ("GLOB" for global), delivery date (Jan. 4, 2022), ship to ("2847," the customer I.D. identified as the purchaser as well), ship to name ("BuildCo"), customer's purchase order number ("6546456"), created by ("JON," the name of the agent that created the purchase order), and total price ("$3,162.56," the sum of the costs of PRODUCT1-PRODUCT5). The interface also displays a list of items 308 purchased in the purchase order and associated information. The parameters 306 are displayed regardless of the underlying PSPA used to originally make the sale (e.g., as part of a process of process type "sale") and/or the underlying PSPA used to execute the "modify order" process.

When interacting with the uniform UI 300, the enterprise user initiating the "modify order" process may be unaware of which of the PSPAs is being invoked by the uniform UI 300 to modify the uniform UI 300. The results page returned by the user's search for the order number includes values for the parameters 306 generally associated with the sales order and the list of items 308 sold in the sales order. In an implementation, even if different divisions of the enterprise use different PSPAs to execute processes of the type "modify order," the uniform UI may remain the same or at least largely the same (e.g., implementations are contemplated in which the interface may differ slightly to include different data fields if the different PSPAs that execute processes of the same process type take different data as input).

In an implementation, the enterprise user clicks the submit button 310 to submit the modified order using the selected PSPA of the process type "modify order." The selected PSPA receives and uses the values of the parameters 306 and/or the list of items 308 in the uniform UI 300 to modify the order record. The modified order record is then reflected in an updated view of the uniform UI (not illustrated). For example, the PSPA or the enterprise system updates the parameters 306 and/or the list of items 308 for display in the uniform UI 300, and/or the PSPA provides a notification that the PSPA's system has been correspondingly updated.

Notably, the appearance of the uniform UI 300 is not affected by the PSPA ultimately used to execute the "modify order" process. Under other circumstances, the enterprise user would have to train the enterprise user to use the different PSPAs, and the output of the different PSPAs would not be visible in a single, uniform UI and/or with a single user experience. The uniform UI 300 is configured to present the input and output data for the different PSPAs in a platform-agnostic manner to mitigate the complexity associated with navigating and arranging output from the different PSPAs and their respective native UIs. The uniform UI 300 provides no indication to an enterprise user of the platform, PSPA, and/or template used to execute the process. Implementations are also contemplated in which the enterprise user is notified of the PSPA in the uniform UI 300.

In an implementation, the uniform UI 300 and its elements are based at least in part on UI data 208 stored in a select process population template associated in memory with a select PSPA to execute a process of the process type. The UI data 208 may include uniform fields. In the illustrated implementation, the uniform fields are represented in the uniform UI 300 as the change button 304, the parameters 306, the list of items 308, and/or the submit button 310.

Figure 4:
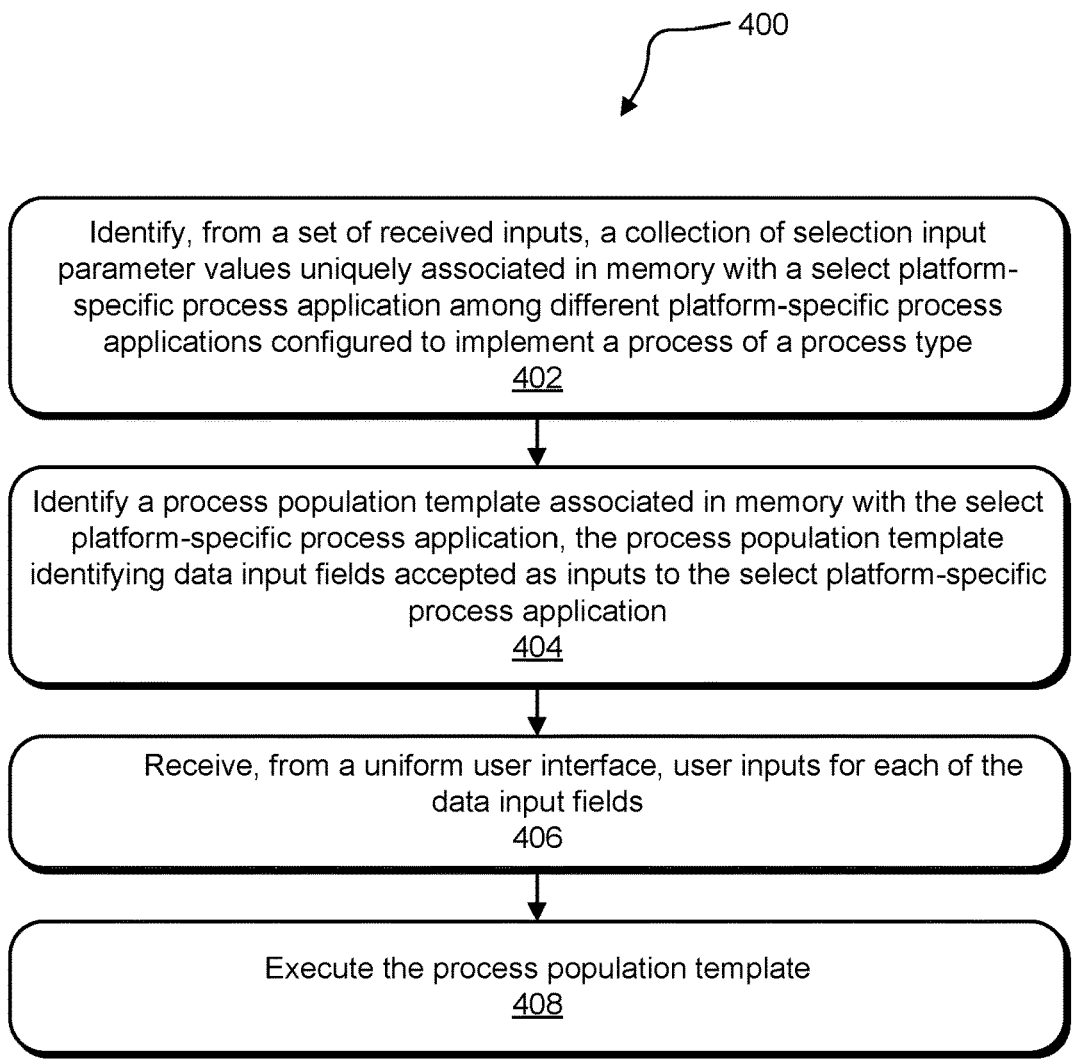
FIG. 4 illustrates example operations for executing a process using platform-specific process applications of a multi-platform process service.

FIG. 4 illustrates example operations 400 for executing a process using platform-specific process applications of a multi-platform process service. An identifying operation 402 identifies, from a set of received inputs, a collection of input parameter values uniquely associated in memory with a select platform-specific process application among different platform-specific process applications configured to implement a process of a process type, as described herein.

An identifying operation 404 identifies a process population template associated in memory with the select platform-specific process application, the process population template identifying data input fields accepted as inputs to the select platform-specific process application, as described herein.

A receiving operation 406 receives, from a uniform user interface (UI), user inputs for each of the data input fields, as described herein.

An executing operation 408 executes the process population template, as described herein. In an implementation, the executing operation 408 further includes a modifying operation that modifies the set of user inputs to generate modified inputs of a form the identified data input fields are configured to provide as input into the platform-specific process application, as described herein. In an implementation, the modifying operation includes changing the data format of the user input. In an implementation, the modifying operation includes performing an operation on a plurality of user inputs of the set of user inputs to yield one of the modified inputs. In another implementation, the executing operation 408, additionally or alternatively, includes an executing operation that executes the select platform-specific process application based on the modified inputs, as described herein.

In an implementation, the operations 400 further include operations to configure the template selection application. In an implementation, these operations include a determining operation that determines the different platform-specific process applications used by an enterprise to implement processes of the process type. In an implementation, these operations further include a determining operation that determines a collection of input parameter values uniquely associated with each one of the different platform-specific process applications of the process type. In an implementation, these operations further include a configuring operation that configures a template selection application to select the select platform-specific process application from the different platform-specific process applications responsive to receiving, from a user, a collection of input parameter values matching the determined collection of input parameter values uniquely associated in memory with the select platform-specific process application, the identifying a collection of input parameter values being based at least in part on the configuration. In an implementation, the operations to configure further include a parsing operation that parses and analyzes log files of a given enterprise to determine the set of the different platform-specific process applications used by the enterprise, as described herein. The operations to configure the template selection application may be omitted in implementations in which the template selection application has already been configured.

In an implementation, the operations 400 further include operations for using UI data supplied by a select process population template. These operations include a providing operation that provides the UI data from the process population template to the uniform UI. The UI data can include a representation of uniform fields for accepting the user inputs. In an implementation, each uniform field uniformly represents a user input corresponding to a field identified differently between the platform-specific process applications. In this implementation, the uniform UI is presented based on the provided UI data. In an implementation, the UI data includes a UI layout specific to the select platform-specific process application. The operations for using the UI data supplied by the select process population template may be omitted under circumstances in which the uniform UI does not use UI data from a process population template.

In an implementation of operations 400, the uniform UI and/or user experience can receive output from the select PSPA and present the output data inline in a uniform manner with output from other PSPAs (e.g., other PSPAs used by different divisions). For example, an international customer service representative enters a sales order for the U.K. division. The customer service representative is then presented with a success notification in a single UI with data from other sales orders from the USA division that was processed by a PSPA different from the one used to process the order in the U.K. division. In an implementation, the uniform UI and/or user experience present the output from the different PSPAs in a uniform manner that presents the output in a uniform manner and/or in a manner agnostic to the PSPA or platform used. Alternatively, the PSPA or platform could be displayed in a field with the output data.

Figure 5:
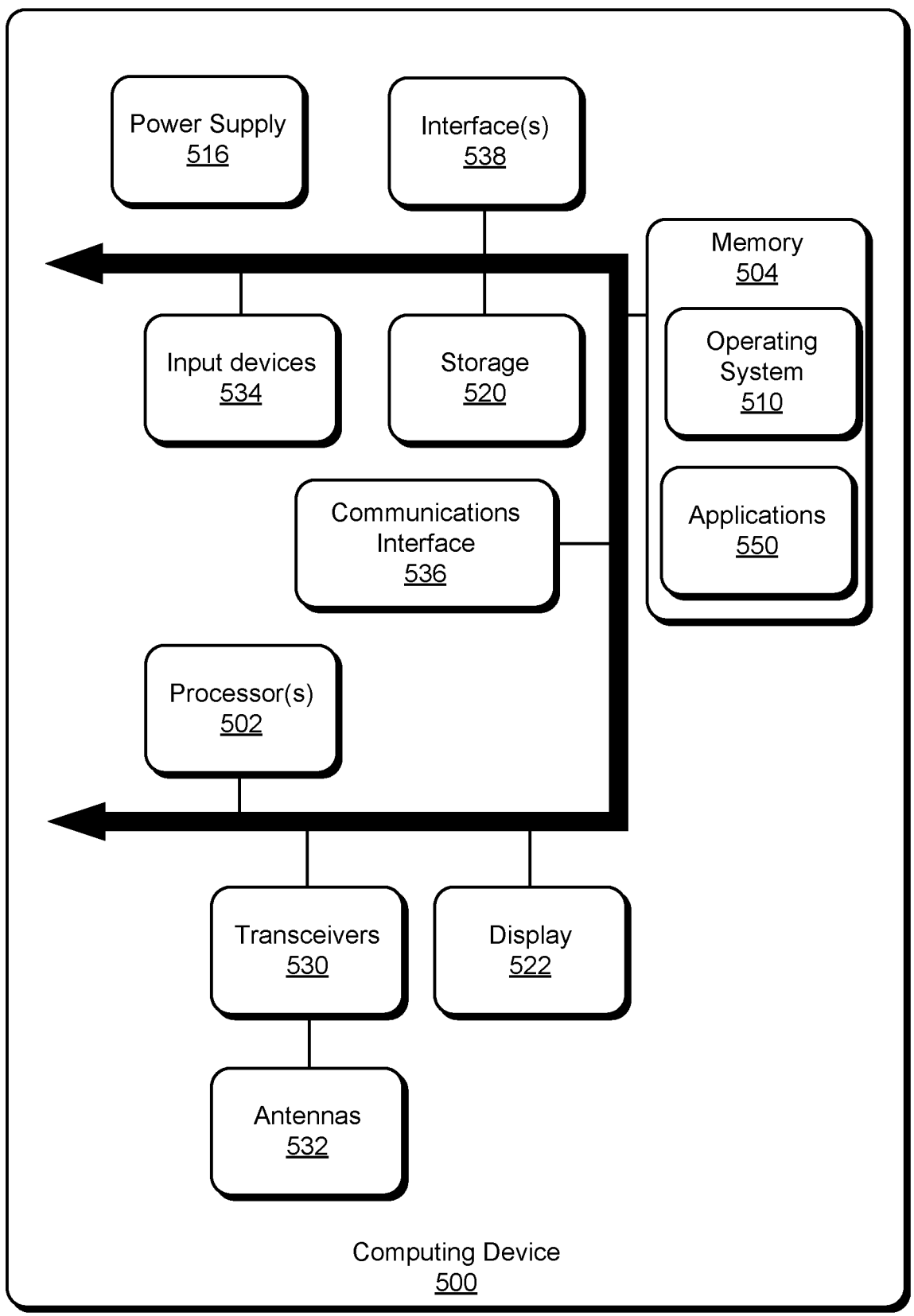
FIG. 5 illustrates an example computing device for implementing the features and operations of the described technology.

FIG. 5 illustrates an example computing device for implementing the features and operations of the described technology. The computing device 500 may embody a remote-control device or a physically controlled device and is an example network-connected and/or network-capable device and may be a client device, such as a laptop, mobile device, desktop, tablet; a server/cloud device; an internet-of-things device; an electronic accessory; or another electronic device. The computing device 500 includes one or more hardware and/or software processor(s) 502 and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550, a template selection configuration manager, a PSPA, a process population template, a uniform user interface, a process application populator 210, or a template selection application are loaded into the operating system 510 on the memory 504 and/or storage 520 and executed by processor (s) 502. The storage 520 may include one or more tangible storage media devices and may store a PSPA, a process population template, user identification data, user credentials, associations between data, parameter values, user interface data, uniform fields, selection input parameters, geographic data, an enterprise identifier, a sub-entity identifier, an enterprise user identifier, a client user identifier, a process, a process type, a user interface, a common user interface, a user experience, a common user experience, locally and globally unique identifiers, requests, responses, log files, a form, user inputs, data input fields, or other data and/or be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (e.g., a network adapter), which is a type of computing device. The computing device 500 may use the communications interface 536 and any other types of computing devices for establishing connections over a wide-area network (WAN) or local-area network (LAN). It should be appreciated that the network connections shown are examples and that other computing devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, R.F., infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

It will be appreciated that a "service," as used herein, is an application program executable across one or multiple user sessions. A service may be available to one or more system components, programs, and/or other services. In some implementations, a service may run on one or more server computing devices.

An example method is provided, including identifying, from a set of received inputs, a collection of selection input parameter values uniquely associated in memory with a select platform-specific process application among different platform-specific process applications configured to implement a process of a process type; identifying a process population template associated in memory with the select platform-specific process application, the process population template identifying data input fields accepted as inputs to the select platform-specific process application; receiving, from a uniform user interface, a set of user inputs; and executing the process population template. The executing the process population template includes modifying the set of user inputs to generate modified inputs of a form consistent with the data input fields accepted as inputs to the select platform-specific process application; and executing the select platform-specific process application based on the modified inputs.

Another example method of any preceding method is provided, further including determining the different platform-specific process applications used by an enterprise to implement processes of the process type; determining a collection of selection input parameter values uniquely associated with each one of the different platform-specific process applications of the process type; and configuring a template selection application to select the select platform-specific process application from the different platform-specific process applications responsive to receiving the collection of selection input parameter values matching the determined collection of selection input parameter values uniquely associated in memory with the select platform-specific process application, the identifying a collection of selection input parameter values being based at least in part on the configuration.

Another example method of any preceding method is provided, further including parsing and analyzing log files of a given enterprise to determine the different platform-specific process applications used by the enterprise.

Another example method of any preceding method is provided, further including providing user interface data from the process population template to the uniform user interface, the user interface data including a representation of uniform fields for accepting the set of user inputs, each uniform field uniformly representing a user input corresponding to a field identified differently between the different platform-specific process applications, the uniform user interface being based on the provided user interface data.

Another example method of any preceding method is provided, the user interface data including a user interface layout specific to the select platform-specific process application.

Another example method of any preceding method is provided, the modifying including changing a data format of the set of user inputs.

Another example method of any preceding method is provided, the modifying including performing an operation on a plurality of user inputs of the set of user inputs to generate one of the modified inputs.

Another example method of any preceding method is provided, further including identifying the process type based on a set of user identification data received as input to a template selection application, the identifying the collection of selection input parameter values being responsive to the identification of the process type.

An example system is provided, including one or more hardware processors; a plurality of process population templates each associated in memory with one of a plurality of different platform-specific process applications configured to implement a process of a process type; a template selection application executable by the one or more hardware processors and configured to: identify, from a set of received inputs, a collection of selection input parameter values uniquely associated in memory with a select platform-specific process application among the plurality of different platform-specific process applications; and identify a process population template associated in memory with the select platform-specific process application from the plurality of process population templates, the process population template identifying data input fields accepted as inputs to the select platform-specific process application. The process population template is operable to receive, from a uniform user interface, a set of user inputs; modify the set of user inputs to generate modified inputs of a form consistent with the data input fields accepted as inputs to the select platform-specific process application; and execute the select platform-specific process application based on the modified inputs.

Another example system of any preceding system is provided, further including a template selection configuration manager, configured to determine the plurality of different platform-specific process applications used by an enterprise to implement processes of the process type; determine a collection of selection input parameter values uniquely associated with each one of the plurality of different platform-specific process applications of the process type; and configure a template selection application to select the select platform-specific process application from the different platform-specific process applications responsive to the identifying of the collection of selection input parameter values matching the determined collection of selection input parameter values uniquely associated in memory with the select platform-specific process application, the identifying of the collection of selection input parameter values being based at least in part on the configuration.

Another example system of any preceding system is provided, the template selection configuration manager further configured to parse and analyze log files of a given enterprise to determine the plurality of different platform-specific process applications used by the enterprise.

Another example system of any preceding system is provided, the process population template further including user interface data including a representation of uniform fields for accepting the set of user inputs, each uniform field uniformly representing a user input corresponding to a field identified differently between the plurality of different platform-specific process applications, the uniform user interface being based on the user interface data.

Another example system of any preceding system is provided, the process population template being operable to modify the set of user inputs by changing a data format of the set of user inputs to generate the modified inputs.

Another example system of any preceding system is provided, the process population template being operable to modify the set of user inputs by performance of an operation on a plurality of user inputs of the set of user inputs to generate one of the modified inputs.

One or more example tangible processor-readable storage media devices embodied with instructions for executing on one or more processors and circuits of a computing device a process is provided. The process includes identifying, from a set of received inputs, a collection of selection input parameter values uniquely associated in memory with a select platform-specific process application among different platform-specific process applications configured to implement a process of a process type; identifying a process population template associated in memory with the select platform-specific process application, the process population template identifying data input fields accepted as inputs to the select platform-specific process application; receiving, from a uniform user interface, a set of user inputs; and executing the process population template. The executing includes modifying the set of user inputs to generate modified inputs of a form consistent with the data input fields accepted as inputs to the select platform-specific process application; and executing the select platform-specific process application based on the modified inputs.

One or more other example tangible processor-readable storage media devices of any preceding media devices is provided, the process further including determining the different platform-specific process applications used by an enterprise to implement processes of the process type; determining a collection of selection input parameter values uniquely associated with each one of the different platform-specific process applications of the process type; and configuring a template selection application to select the select platform-specific process application from the different platform-specific process applications responsive to receiving the collection of selection input parameter values matching the determined collection of selection input parameter values uniquely associated in memory with the select platform-specific process application, wherein the identifying the collection of selection input parameter values is based at least in part on the configuration.

One or more other example tangible processor-readable storage media devices of any preceding media devices is provided, the process further including parsing and analyzing log files of a given enterprise to determine the different platform-specific process applications used by the enterprise.

One or more other example tangible processor-readable storage media devices of any preceding media devices is provided, the process further including providing user interface data from the process population template to the uniform user interface, the user interface data including a representation of uniform fields for accepting the set of user inputs, each uniform field uniformly representing a user input corresponding to a field identified differently between the different platform-specific process applications, wherein the uniform user interface is based on the provided user interface data.

One or more other example tangible processor-readable storage media devices of any preceding media devices is provided, wherein the modifying includes changing a data format of the set of user inputs.

One or more other example tangible processor-readable storage media devices of any preceding media devices is provided, wherein the modifying includes performing an operation on a plurality of user inputs of the set of user inputs to generate one of the modified inputs.

An example system is provided, including means identifying, from a set of received inputs, a collection of selection input parameter values uniquely associated in memory with a select platform-specific process application among different platform-specific process applications configured to implement a process of a process type; means for identifying a process population template associated in memory with the select platform-specific process application, the process population template identifying data input fields accepted as inputs to the select platform-specific process application; means for receiving, from a uniform user interface, a set of user inputs; and means for executing the process population template. The means for executing the process population template include means for modifying the set of user inputs to generate modified inputs of a form consistent with the data input fields accepted as inputs to the select platform-specific process application; and means for executing the select platform-specific process application based on the modified inputs.

Another example system of any preceding system is provided, further including means for determining the different platform-specific process applications used by an enterprise to implement processes of the process type; means for determining a collection of selection input parameter values uniquely associated with each one of the different platform-specific process applications of the process type; and means for configuring a template selection application to select the select platform-specific process application from the different platform-specific process applications responsive to receipt of the collection of selection input parameter values matching the determined collection of selection input parameter values uniquely associated in memory with the select platform-specific process application, the identification of a collection of selection input parameter values being based at least in part on the configuration.

Another example system of any preceding system is provided, further including means for parsing and analyzing log files of a given enterprise to determine the different platform-specific process applications used by the enterprise.

Another example system of any preceding system is provided, further including means for providing user interface data from the process population template to the uniform user interface, the user interface data including a representation of uniform fields for accepting the set of user inputs, each uniform field uniformly representing a user input corresponding to a field identified differently between the different platform-specific process applications, the uniform user interface being based on the provided user interface data.

Another example system of any preceding system is provided, the user interface data including a user interface layout specific to the select platform-specific process application.

Another example system of any preceding system is provided, the means for modifying including means for changing a data format of the set of user inputs.

Another example system of any preceding system is provided, the means for modifying including means for performing an operation on a plurality of user inputs of the set of user inputs to generate one of the modified inputs.

Another example system of any preceding system is provided, further including means for identifying the process type based on a set of user identification data received as input to a template selection application, the identification of the collection of selection input parameter values being responsive to the identification of the process type.

An example method is provided. The method includes identifying, by a template selection application, different platform-specific process applications associated in memory with a process type; presenting, to a user display, a form on a graphical user interface (GUI) of the template selection application, the form requesting user inputs related to the process type; identifying, from within a set of the user inputs received through the form, a collection of input parameter values uniquely associated in memory with a select platform-specific process application of the different platform-specific process applications available to implement processes of the process type; identifying a template associated in memory with the select platform-specific process application, the template identifying data input fields configured to receive data usable by the select platform-specific process application to execute the process of the process type; receiving, through the template, user inputs for each of the data input fields; automatically populating the data input fields of the select platform-specific process application with the user inputs received through the template; and executing, by the select platform-specific process application, a process of the process type based on the populated data input fields.

Another example method of any preceding method is provided, further including determining a set of platform-specific process applications used by an enterprise to implement processes of the process type; determining a collection of input parameter values uniquely associated with each one of the different platform-specific process applications of the process type; and configuring the template selection application to select the select platform-specific process application from the different platform-specific process applications responsive to receiving, from a user, a collection of input parameter values matching the determined collection of input parameter values uniquely associated in memory with the select platform-specific process application.

Another example method of any preceding method is provided, further including parsing and analyzing log files of a given enterprise to determine the set of the different platform-specific process applications used by the enterprise.

Another example method of any preceding method is provided, further including receiving an entity-defined system input, wherein identifying the collection of input parameter values uniquely associated in memory with the select platform-specific process application is further from the entity-defined system input.

Another example method of any preceding method is provided, further including identifying a select platform of a plurality of platforms based on the user inputs received through the form, wherein the collection of input parameter values includes a platform identifier identifying the select platform.

Another example method of any preceding method is provided further including concealing, from the user display, the select platform-specific process application.

Another example method of any preceding method is provided further including identifying the process type based on set of login credentials received as input to a template selection application.

An example method is provided. The method includes receiving, from a user, a selection of a process type as input into a template selection application, the process type associated in memory with a set of login credentials of the user; identifying, by the template selection application, different platform-specific process applications operable to execute a process of the process type; receiving, by the template selection application, platform selection data, the platform selection data including parameter values uniquely associated in memory with a select platform-specific process application of the different platform-specific process applications; identifying, by the template selection application, a template associated in memory with the select platform-specific process application, the template identifying data input fields usable by the select platform-specific process application to execute the process of the process type; presenting the template in a graphic user interface (GUI); receiving, through the GUI, user inputs for each of the data input fields; and executing, by the select platform-specific process application, the process of the process type based on the received user inputs.

Another example method of any preceding method is provided, further including parsing and analyzing log files of an enterprise to determine the set of the different platform-specific process applications used by the enterprise.

Another example method of any preceding method is provided, further including associating the enterprise with an enterprise identifier in memory based on the parsed and analyzed log files, wherein the platform selection data further includes the enterprise identifier.

Another example method of any preceding method is provided, further including parsing and analyzing a set of log files; based on the parsing and analyzing of the set of logfiles: identifying the select platform-specific process application as an application that is configured to execute the process of the process type used by a first sub-entity of an enterprise; and identifying a second platform-specific process application of the different platform-specific process applications that are configured to execute the process of the process type used by a second sub-entity of the enterprise, the select platform-specific process application being different from the second platform-specific process application.

Another example method of any preceding method is provided, further including associating the parameter values in memory with the select platform-specific process application based on the identification of the select platform-specific process application as an application that is configured to execute the process of the process type used by the first sub-entity of the enterprise; and selecting the select platform-specific process application for execution of the process based on the association between the parameter values and the select platform-specific process application, wherein identifying the template is responsive to the selection.

Another example method of any preceding method is provided, further including rejecting the second platform-specific process application for execution of the process based on the association between the parameter values and the select platform-specific process application.

Another example method of any preceding method is provided, wherein the different platform-specific process applications each execute from a different service entity.

Another example method of any preceding method is provided, further including concealing, from the GUI, the select platform-specific process application.

Another example method of any preceding method is provided, wherein the parameter values include geographic data associated with a client for which the process is executed by the user.

Another example method of any preceding method is provided, wherein the parameter values include geographic data associated with an enterprise by which the process is executed.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Moreover, the separation of various system components in the implementations described above should not be understood as requiring such separation in all implementations, and it should be understood that the described program components and systems can generally be integrated together into a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method, comprising:
   identifying, from a set of received inputs, one or more input parameter values uniquely associated in memory with a select platform-specific process application among different platform-specific process applications configured to implement a process of a same process type;
   identifying a process population template associated in memory with the select platform-specific process application, the process population template identifying data input fields accepted as inputs to the select platform-specific process application;
   receiving, from a uniform user interface, a set of user inputs; and
   executing the process population template, including:
   changing a data format of the set of user inputs to generate modified inputs of a form consistent with the data input fields accepted as inputs to the select platform-specific process application; and
   executing the select platform-specific process application based on the modified inputs.

2. The method of claim 1, further comprising:
   determining the different platform-specific process applications used by an enterprise to implement processes of the same process type;
   determining a collection of select input parameter values uniquely associated with each one of the different platform-specific process applications of the same process type; and
   selecting the select platform-specific process application from the different platform-specific process applications responsive to determining that the one or more input parameter values match the-collection of selection input parameter values uniquely associated in memory with the select platform-specific process application.

3. The method of claim 2, further comprising:
   parsing and analyzing log files of a given enterprise to determine the different platform-specific process applications used by the enterprise.

4. The method of claim 1, further comprising:
   providing user interface data to the uniform user interface, the user interface data including a representation of uniform fields for accepting the set of user inputs, each uniform field uniformly representing a user input corresponding to a field identified differently between the different platform-specific process applications.

5. The method of claim 4, the user interface data including a user interface layout specific to the select platform-specific process application.

6. The method of claim 1, wherein modifying the set of user inputs includes performing an operation on a plurality of user inputs of the set of user inputs to generate one of the modified inputs.

7. The method of claim 1, further comprising:
   identifying the same process type based on user identification data received as input to a template selection application, wherein the one or more input parameter values are identified responsive to the identification of the same process type.

8. A system, comprising:
   one or more hardware processors;
   a plurality of process population templates each associated in memory with one of a plurality of different platform-specific process applications configured to implement a process of a same process type;
   a template selection application executable by the one or more hardware processors and configured to:
   identify, from a set of received inputs, one or more input parameter values uniquely associated in memory with a select platform-specific process application among the plurality of different platform-specific process applications; and identify a process population template associated in memory with the select platform-specific process application from the plurality of process population templates, the process population template identifying data input fields accepted as inputs to the select platform-specific process application, the process population template being executable to:

receive, from a uniform user interface, a set of user inputs;

change a data format of the set of user inputs to generate modified inputs of a form consistent with the data input fields accepted as inputs to the select platform-specific process application; and execute the select platform-specific process application based on the modified inputs.

9. The system of claim 8, wherein the template selection application is further configured to:

determine the plurality of different platform-specific process applications used by an enterprise to implement processes of the same process type;

determine a collection of select input parameter values uniquely associated with each one of the plurality of different platform-specific process applications of the same process type; and select the platform-specific process application from the different platform-specific process applications responsive to determining that the one or more input parameter values match the collection of select input parameter values uniquely associated in memory with the select platform-specific process application.

10. The system of claim 9, wherein the template selection application is further configured to:

parse and analyze log files of a given enterprise to determine the plurality of different platform-specific process applications used by the enterprise.

11. The system of claim 8, wherein the uniform user interface defines:

user interface data including a representation of uniform fields for accepting the set of user inputs, each uniform field uniformly representing a user input corresponding to a field identified differently between the plurality of different platform-specific process applications.

12. The system of claim 8, the process population template being operable to modify the set of user inputs by performance of an operation on a plurality of user inputs of the set of user inputs to generate one of the modified inputs.

13. One or more tangible processor-readable storage media devices embodied with instructions for executing on one or more processors and circuits of a computing device a process, the process comprising:

identifying, from a set of received inputs, one or more input parameter values uniquely associated in memory with a select platform-specific process application among different platform-specific process applications configured to implement a process of a same process type;

identifying a process population template associated in memory with the select platform-specific process application, the process population template identifying data input fields accepted as inputs to the select platform-specific process application;

receiving, from a uniform user interface, a set of user inputs; and executing the process population template, the executing comprising:

changing a data format of the set of user inputs to generate modified inputs of a form consistent with the data input fields accepted as inputs to the select platform-specific process application; and executing the select platform-specific process application based on the modified inputs.

14. The one or more tangible processor-readable storage media devices of claim 13, the process further comprising:

determining the different platform-specific process applications used by an enterprise to implement processes of the same process type;

determining a collection of select input parameter values uniquely associated with each one of the different platform-specific process applications of the same process type; and selecting the select platform-specific process application from the different platform-specific process applications responsive to determining that the one or more input parameter values match the collection of select input parameter values uniquely associated in memory with the select platform-specific process application.

15. The one or more tangible processor-readable storage media devices of claim 14, the process further comprising:

parsing and analyzing log files of a given enterprise to determine the different platform-specific process applications used by the enterprise.

16. The one or more tangible processor-readable storage media devices of claim 13, the process further comprising:

providing user interface data to the uniform user-interface, the user interface data including a representation of uniform fields for accepting the set of user inputs, each uniform field uniformly representing a user input corresponding to a field identified differently between the different platform-specific process applications.

17. The one or more tangible processor-readable storage media devices of claim 13, wherein modifying set the set of user inputs includes performing an operation on a plurality of user inputs of the set of user inputs to generate one of the modified inputs.

* * * * *